United States Patent
Rettig

(10) Patent No.: US 8,394,222 B2
(45) Date of Patent: Mar. 12, 2013

(54) DEVICE AND METHOD FOR MANUFACTURING A FIBER COMPOSITE COMPONENT

(75) Inventor: Bernd Rettig, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 345 days.

(21) Appl. No.: 12/742,443

(22) PCT Filed: Nov. 17, 2008

(86) PCT No.: PCT/EP2008/009713
§ 371 (c)(1), (2), (4) Date: May 12, 2010

(87) PCT Pub. No.: WO2009/062749
PCT Pub. Date: May 22, 2009

(65) Prior Publication Data
US 2010/0252182 A1 Oct. 7, 2010

Related U.S. Application Data

(60) Provisional application No. 60/988,267, filed on Nov. 15, 2007.

(30) Foreign Application Priority Data

Nov. 15, 2007 (DE) .......................... 10 2007 054 645

(51) Int. Cl.
*B65H 81/00* (2006.01)
(52) U.S. Cl. ......... 156/169; 156/173; 156/175; 156/425
(58) Field of Classification Search .................. 156/169, 156/172, 173, 175, 425
See application file for complete search history.

(56) References Cited

U.S. PATENT DOCUMENTS

| | | | |
|---|---|---|---|
| 3,397,847 A | | 8/1968 | Thaden |
| 3,708,131 A | * | 1/1973 | Barthel .......................... 242/436 |
| 3,727,851 A | * | 4/1973 | Beninati et al. ................ 242/436 |
| 4,323,408 A | * | 4/1982 | Dana et al. ..................... 156/175 |
| 5,031,846 A | * | 7/1991 | Lea et al. ....................... 156/425 |
| 7,282,107 B2 | | 10/2007 | Johnson et al. |
| 2005/0039843 A1 | | 2/2005 | Johnson et al. |

(Continued)

FOREIGN PATENT DOCUMENTS

| | | |
|---|---|---|
| DE | 1779172 A * | 9/1971 |
| DE | 38 43 488 A1 | 7/1990 |

(Continued)

OTHER PUBLICATIONS

International Preliminary Report on Patentability for corresponding PCT application PCT/EP08/009713, dated Jun. 1, 2010.

(Continued)

*Primary Examiner* — Jeff Aftergut
(74) *Attorney, Agent, or Firm* — Matthew B. Dernier, Esq.; Gibson & Dernier LLP

(57) ABSTRACT

A device for manufacturing an FC component with at least one distributing device for placing at least band-shaped material onto a surface of a tool mold or semi-finished product for manufacturing the FC component, wherein the device has at least one bogie truck that carries the distributing device and a guide way that runs around the surface at least partially in its circumferential direction, on which the bogie truck for traversing the distributing device can be moved relative to the surface, as well as a method for manufacturing a fiber composite component and a component fabricated according to such a method.

15 Claims, 9 Drawing Sheets

U.S. PATENT DOCUMENTS

2006/0118244 A1 6/2006 Zaballos et al.
2006/0175454 A1 8/2006 Allen
2008/0156436 A1 7/2008 Johnson et al.

FOREIGN PATENT DOCUMENTS

| DE | 41 22 785 A1 | | 1/1993 |
|---|---|---|---|
| FR | 2082343 A | * | 12/1971 |
| WO | 91/04843 A2 | | 4/1991 |
| WO | 2005/018917 A2 | | 3/2005 |
| WO | 2005/105641 A2 | | 11/2005 |
| WO | 2006/060270 A1 | | 6/2006 |

OTHER PUBLICATIONS

International Search Report for corresponding PCT application PCT/EP08/009713, dated Feb. 9, 2009.

* cited by examiner

DEVICE AND METHOD FOR MANUFACTURING A FIBER COMPOSITE COMPONENT

CROSS REFERENCE TO RELATED APPLICATIONS

This application claims priority to PCT Application No. PCT/EP2008/009713, filed Nov. 17, 2008; which claims priority to German Patent Application No. DE 10 2007 054 645.0, filed Nov. 15, 2007, and claims the benefit to U.S. Provisional Patent Application No. 60/988,267, filed Nov. 15, 2007, the entire disclosures of which applications are hereby incorporated by reference.

BACKGROUND

The invention relates to a device for manufacturing a fiber composite (FC) component, a method for manufacturing a fiber composite component, as well as a fiber composite component manufactured with such a method.

DE 41 22 785 A1 describes a winder for manufacturing components out of fiber-reinforced plastics with a winding overhang for stacking longitudinal reinforcements with small grasper windings relative to the winding axis. The winder has a carriage that can traverse an additional carriage guide of the winding axis parallel to a winding overhang, as well as a thread guide that is arranged on a rotor and has an unwinding unit with a cradle.

Documents DE 38 43 488 A1, U.S. Pat. No. 3,397,847 A and WO 91/04843 describe a device for manufacturing a FC component with at least one distributing device for placing material onto a surface to manufacture the FC component.

WO 2005/018917 A2 described a device for applying laminating threads or laminating webs onto a rotating drum for manufacturing a composite component. The laminating threads are applied by means of distributing devices, which can traverse a ring and are mounted so that they can rotate on a bearing axis.

Known from WO 2006/060270 A1 is a distributing device for distributing and applying laminating webs on an application surface.

Automation technology has essentially helped to increase the productivity, flexibility and efficiency of modern methods for manufacturing fiber composite components, wherein automatic fiber depositing devices, so-called automated fiber placement systems (AFP systems) are increasingly gaining in importance alongside the manual procedures.

In particular the use of such automatic fiber placement systems with one or more traversable application heads, with which a pre-impregnated fiber composite band, for example a unidirectional CFK prepreg band (UD-CFK prepreg band), is applied to a working surface of a tool mold or component, yields shorter throughput times in production, with a higher utilization of production potential, resulting in diminished manufacturing costs for the composite products. The idle times arising from manual operations can be reduced to a minimum while retaining a high production quality.

For example, such a device for manufacturing fiber composite components is known from WO 2005/105641 A2. This conventional fiber placement system uses a plurality of independently pivoting application heads, with which composite bands can be applied to a working surface of a tool mold. To this end, the application heads are each arranged on a carrier system, which can traverse parallel to a longitudinal axis of the tool mold to be coated on guide rails. A rotationally symmetrical tool mold can be mounted between the application heads so as to rotate along its longitudinal axis, so that its outside circumference is coated with the composite band when the tool mold turns and the application heads shift axially along the guide rails. The disadvantage to such fiber placement systems is that they involve complicated equipment, and are not suitable for coating tool molds with a curved longitudinal axis due to the guide rails arranged parallel to the longitudinal axis of the tool mold.

SUMMARY OF THE INVENTION

By contrast, the object of the invention is to provide a device and a method for manufacturing fiber composite components, which in particular are also curved in their longitudinal direction, as well as a fiber composite component manufactured according to such a method, which enable a largely automated manufacture at a diminished complexity of equipment by comparison to conventional solution.

These objects are achieved with the features disclosed and described herein. Additional embodiments are also disclosed and described herein.

The invention provides in particular a device for manufacturing an FC component with at least one distributing device for placing at least one material, and in particular at least one band-shaped material, onto the surface of a tool mold or semi-finished product for manufacturing the FC component. The device has at least one bogie truck that carries the distributing device, and a guide way that runs around the surface at least partially in its circumferential direction, and on which the bogie truck can be moved relative to the surface for traversing the distributing device. The distributing device can here be pivoted or rotated around a swiveling axis that runs at an angle relative to the guide way. In particular, the device can be configured in such a way that the tool mold or semi-finished product and the path of motion can be moved relative to each other.

For a special advantageous application, in which the semi-finished product is coated more or less only in the circumferential direction, the device can have a guide for moving the tool mold or semi-finished product and the path of motion relative to each other.

In an exemplary embodiment of the invention, a feeder and/or the guide can be configured in such a way that the tool mold or semi-finished product can be moved not just along its longitudinal direction, but also perpendicular thereto. As a result, the tool mold or semi-finished product can be guided by the guide in a manner to be described as three-dimensional or fed relative to the guide way.

According to an exemplary embodiment, the feeder and/or guide can further be configured in such a way as to guide the tool mold or semi-finished product by only shifting it axially, i.e., along its longitudinal direction, and/or around an axis perpendicular to the longitudinal direction, but not around an axis running in the longitudinal direction. In this exemplary embodiment, this means among other things that, while applying the material from the application heads, the circumferential application results from the motion of the bogie truck on the guide way, to the extent the application takes place along such a direction on the surface of the tool mold or semi-finished product corresponding to the direction of a component perpendicular to the longitudinal direction, i.e., in the circumferential direction of the tool mold or semi-finished product.

The feeder and/or guide can be configured in such a way that, given a predetermined curvature of the tool mold or semi-finished product in the longitudinal direction with a radius of curvature that is variable or non-variable along the longitudinal direction, the direction of the radius of curvature toward the instantaneous midpoint of the region on which the band material is being placed by the distributing device onto the surface of the tool mold or semi-finished product deviates by at most 30 degrees from the radial plane that is mounted in the relevant segment of the path of motion or of the vertical onto the tangential plane of the guide way at the instantaneous location of the truck. The guide for moving the tool mold or semi-finished product and the path of motion relative to each other can also be configured in such a way that, given a predetermined curvature of the took mold or semi-finished product in the longitudinal direction with a radius of curvature that is variable or non-variable along the longitudinal direction, the direction of the radius of curvature toward the midpoint of the region on which the band material is being placed by the distributing device onto the surface of the tool mold or semi-finished product deviates by at most 30 degrees from the radial plane that is mounted by the path of motion.

In particular, the feeder and/or the guide can be configured in such a way that, given a predetermined curvature of the tool mold or semi-finished product in the longitudinal direction with a radius of curvature that is variable or non-variable along the longitudinal direction, the direction of the radius of curvature toward the instantaneous midpoint of the region on which the bad material is being placed by the distributing device onto the surface of the tool mold or semi-finished product deviates by at most 30 degrees from the radial plane that is mounted in the relevant segment by the path of motion, or form the vertical toward the tangential plane of the guide way at the instantaneous position of the truck. The guide for moving the tool mold or semi-finished product and the path of motion relative to each other can also be configured in such a way that, given a predetermined curvature of the tool mold or semi-finished product in the longitudinal direction with a radius of curvature that is variable or non-variable along the longitudinal direction, the direction of the radius of curvature toward the midpoint of the region on which the band material is placed by the distributing device onto the surface of the tool mold or semi-finished product deviates by at most 30 degrees from the radial plane that is clamped by the path of motion.

The guide way can form an at least sectionally circular curved path. The guide way can further be accommodated in an at least sectionally annular carrier section that at least partially envelops or circles the tool mold or semi-finished product. The guide way can here run sectionally transverse to the longitudinal direction of the tool mold or semi-finished product.

The guide way can have at least one rail for accommodating a roller set of the bogie truck, wherein one roller or several rollers can be motorized. Additionally or alternatively, the guide way can have at least one toothed section, which can be engaged with at least one driving wheel of the bogie truck.

The manufacturing device can have a controller for actuating the guide, through which a relative motion can take place between the tool mold or semi-finished product and the guide way through, either manually or automatically. The controller and guide can be designed in such a way that the tool mold or semi-finished product can be moved relative to the guide way or vice versa. The controller and guide can here be used to move the tool mold or semi-finished product relative to the guide way in such a way that the angle between the lengthwise extension of the band material between the distributing device and location of the surface of the tool mold or semi-finished product upon which the bad material is placed during its placement and the radial plane as viewed in the radial plane measures less than 30 degrees.

The controller and guide can be configured in such a way that makes it possible to use the controller and guide for controlling the motion of the bogie truck along the guide way for placing the material on the surface of the tool mold or on the surface of the semi-finished product and/or the rotational motion of the distributing device. The controller and guide can also be configured in such a way that makes it possible to use the controller and guide to control the distribution of material from the application head onto the surface of the tool mold or the surface of the semi-finished product. The radius of curvature of the curved path can be made to at least sectionally correspond to the radius of curvature of the tool mold or semi-finished product using the controller and guide.

In particular, a tangent applied to the radius of curvature of the tool mold or semi-finished product in the area of a section of the tool mold or semi-finished product can have an angle of about 90° (i.e., ±15 degrees) relative to a radial plane clamped on by the path of motion.

The guide for moving the too mold or semi-finished product can have at least one robot arm. The robot arm can here be arranged outside the path of motion of the bogie truck, and hold or at least sectionally grip and end section of the tool mold or semi-finished product for purposes of coupling with the tool mold or semi-finished product.

The device or guide for moving the tool mold or semi-finished product can be a feeder path or a carrier or carrier part and a feeder truck that can move on the latter, on which the tool mold or semi-finished product can be held. The carrier part can have at least a rail for accommodating a roller set of the feeder truck. The carrier part can also have at least one toothed section, which can be engaged with at least one driving wheel of the feeder truck.

The controller can have a CNC controller, one function of which is used to control the movement of the bogie truck along the path of motion, the distributing device along the pivoting axis and/or the tool mold or semi-finished product and the path of motion relative to each other.

The movement of the bogie truck along the guide way and feed motion of the tool mold or semi-finished product and/or the guide way can be coupled with each other by means of a coupling device.

The controller can have a function for actuating the guide, with which the band material can be flatly and partially applied to the surface.

The controller can also have a function for actuating the guide, with which a pattern can be stored, and used to flatly or partially apply the band material to the surface.

In general, several application heads can be provided on a bogie truck or several bogie trucks, which can move on the guide way, and which each have at least one distributing device.

The device can have several guide ways, each with a bogie truck or several bogie trucks.

The controller and guide can be configured in such a way as to enable their use to actuate several application heads for the parallel placement of the band material.

The controller can be provided in such a way that two application heads can be moved at an angle of 180 degrees offset by ±30 degrees relative to each other viewed in the circumferential direction of the tool mold or semi-finished product.

The guide way and rotational position of the distributing device can be adjusted with regard to the surface of the tool mold or semi-finished product to be coated with the material in such a way that the composite material can be applied to the tool mold or semi-finished product at an angle α of 0 degrees ±15 degrees relative to the longitudinal axis of the tool mold or semi-finished product.

The controller can be provided in such a way that the guide way and rotational position of the distributing device can be adjusted with regard to the surface of the tool mold or semi-finished product to be coated with the material in such a way that the composite material can be applied to the tool mold or semi-finished product at an angle α ranging from more than 0° to about 90°, preferably from ±45 degrees, ±60 degrees and/or 90 degrees, respectively ±5 degrees, relative to the longitudinal axis of the tool mold or semi-finished product.

Also provided according to the invention is a method for manufacturing an FC component with at least one distributing device for placing at least one band material onto the surface of a tool mold or semi-finished product for manufacturing the FC component, wherein the distributing device is arranged on a bogie truck and traverses along a guide way that circles the surface at least partially in its circumferential direction, dispensing the band material in the process and placing it on the surface. It can here be provided that a pivoting motion along a swiveling axis placed adjacent to the path of motion be controllably imparted to the distributing device, either manually or with a controller having the corresponding functions, as well as to a guide, so as to adjust the composite angle. It can here be provided that the tool mold or component and the path of motion be moved relative to each other.

These variants can additionally provide that the guide way and rotational position of the distributing device are adjusted with regard to the surface of the tool mold or semi-finished product to be coated with the material in such a way that the composite is placed on the tool mold or semi-finished product at an angle α of 0 degrees ±15 degrees relative to the longitudinal axis of the tool mold or semi-finished product.

As an alternative, it can be provided that the guide way and rotational position of the distributing device are adjusted with regard to the surface of the tool mold or semi-finished product to be coated with the material in such a way that the composite is placed on the tool mold or semi-finished product at an angle α ranging from more than 0° to about 90°, preferably from ±45 degrees, ±60 degrees and/or 90 degrees, respectively ±5 degrees, relative to the longitudinal axis of the tool mold or semi-finished product.

The controller can be provided in such a way as to adjust the guide way in an area of the surface of the tool mold or semi-finished product to be coated with the material and the rotational position of the distributing device in such a way that the band material is applied in opposing longitudinal directions of the tool mold or semi-finished product at an angle α ranging from 45 degrees ±5 degrees with regard to the longitudinal axis of the tool mold or semi-finished product, wherein the band material has a width b as a function of the circumference C of the tool mold or component according to the formula $$b = \frac{C}{\sqrt{2}}.$$

The aforementioned method can be used to fabricate a frame as the FC component, in particular a CFK fuselage frame or a fuselage segment of an airplane.

The tool mold in the method can be a tool mold that has at least a pair of diametrically arranged, grooved recesses, which each extend parallel to the longitudinal axis of the tool mold.

The material, and in particular band material, used can be a material comprised of a pre-impregnated fiber composite band, in particular a unidirectional CFK prepreg band (UD-CFK prepreg band). As an alternative, use can be made of a material comprised of a pre-impregnated fiber bundle or a pre-impregnated fiber strand (roving), in particular a CFK roving.

Also provided according to the invention is a fiber composite component, and in particular a CFK frame or a fuselage segment for an airplane, which is manufactured using one of the methods enumerated above.

Preferred exemplary embodiments of the invention are explained in greater detail below based on diagrammatic drawings. Shown on:

DETAILED DESCRIPTION OF THE INVENTION

Figure 1:
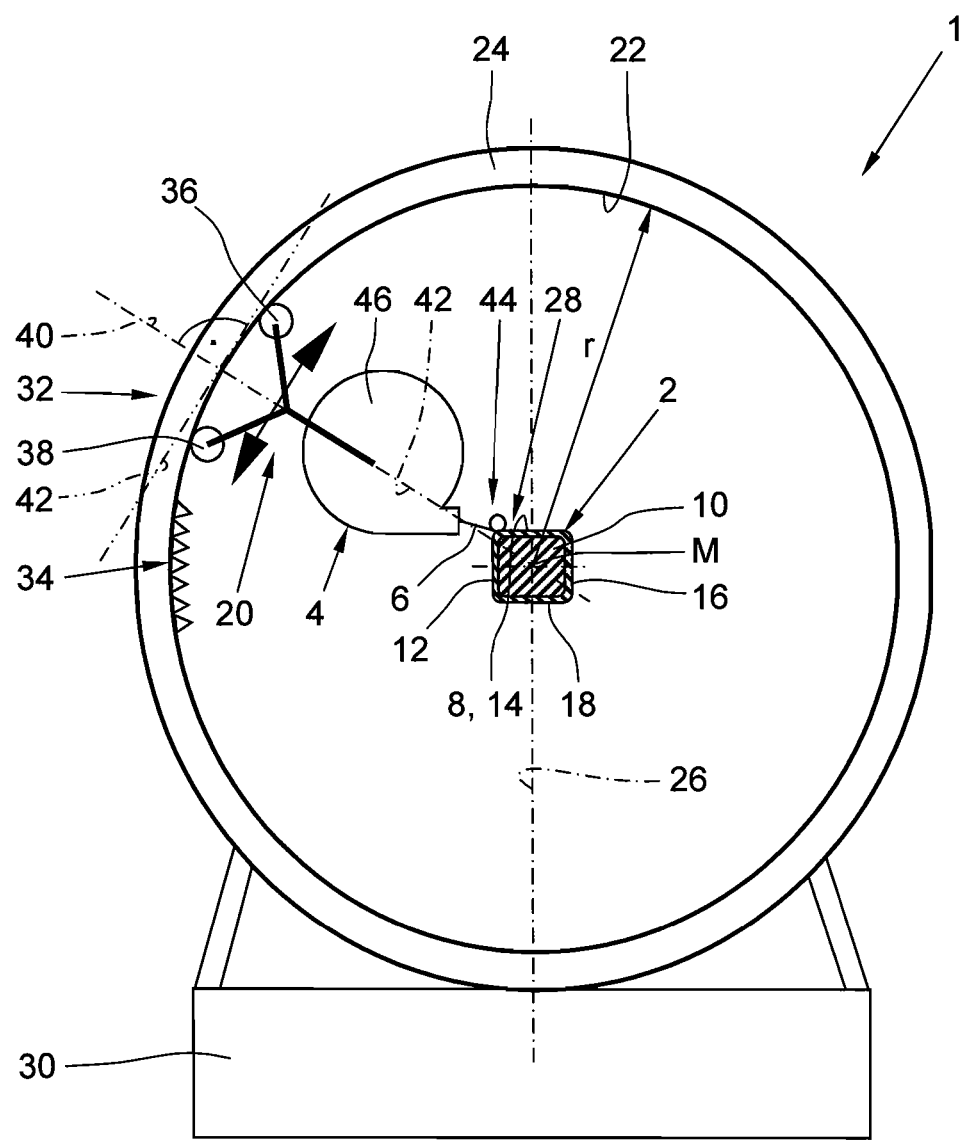
FIG. 1 is a front view of a device for manufacturing a fiber composite component according to a first exemplary embodiment of the invention.

FIG. 1 is a front view of the device 1 according to the invention for manufacturing a component that at least partially consists of fiber composites out of a semi-finished product 2, which can be the forming component in an intermediate stage or a prefabricated part for this purpose. In particular, the component to be manufactured can be an airplane component. The semi-finished product can be a prefabricated intermediate product or the component in the process of being formed. The material can be placed on a tool mold part, or more succinctly a molding or a tool mold, for example a positive mold (mandril), or on a tool mold already coated with material. In an exemplary embodiment also depicted on the figures, the device 1 according to the invention or the method according to the invention is used to manufacture frames, in particular CFK fuselage frames, of an airplane.

In particular for applications in the aerospace industry or automotive industry, pre-impregnated fiber composites, also referred to as prepregs, which consist of a resin mixture, can be used while retaining a defined volumetric fiber content of an impregnated reinforcement fibers. The strength of the fiber composite is here essentially determined by the reinforcement fibers. In this way, the volumetric fiber percentage selected for a weight-optimized component can be relatively high.

A pre-impregnated fiber bundle or fiber strand (roving), in particular a CFK roving, can also be used for coating the tool mold or component.

The device 1 has a or generally one distributing device 4 or an application head 4, which is suitable for collecting and distributing a predetermined amount of material for manufacturing the component. For example, the distributing device 4 can have a spool for collecting and distributing the material, or consist of the latter. In particular, the distributing device can have a housing that incorporates the material, e.g., by way of the spool, and an opening provided therein through which the material is passed from the inside of the housing to the outside. In particular, the distributing device can have a feeder, which can be used to influence or control the distribution of material. The feeder can have a motor, with which the material can be distributed or unwound from a spool. When using a spool, the motor can power the spool, so as to collect material on the spool and/or unwind material from the spool. The motor can be connected with a controller of the manufacturing device. Alternatively or additionally, the feeder can have a spring arrangement with which the material can be distributed in response to a pre-tensioning force. The distributing device 4 can have at least one application device 44, for example an application roller, for pressing or winding the composite band 6 against or onto the working surface 8 of the tool mold 10. The composite band 6 is here wound onto a roller (not shown) arranged inside a housing 46 of the distributing device 4, and made available via the latter to the application device 44.

The material for using the manufacturing device according to the invention or the manufacturing method according to the invention can include basically any laminate material, in particular any band material. In particular, the material can be a composite band 6 (slit tape), i.e., a band consisting of a composite. Use can be made in particular of a composite band 6 consisting of a unidirectional CFK prepreg band (UD-CFK prepreg band) suitable for manufacturing high-strength structures.

The distributing device 4 is used to place the material in a defined manner onto a working surface 8 of a tool mold 10 or a semi-finished product 2. In particular, the material can be placed onto the tool mold or semi-finished product at a predetermined band progression or predetermined angle to the longitudinal direction of the tool mold or semi-finished product.

The material 6 can be placed on a tool mold that is designed as a positive mold 10 (mandril; mandrel). As depicted, the tool mold 10 can have an essentially rectangular cross section with four lateral surfaces 12, 14, 16, 18, which form a shared working surface 8 that can be completely or partially coated with the material 6. In this case, in particular several layers of the material 6 can be placed on the tool mold 10, at least sectionally. The manufacturing device 1 has a guide way 22 for guiding a bogie truck 20. Since the distributing device or application head 4 is situated on the bogie truck 20, the distributing device 4 can move relative to the respective working surface 8 as the bogie truck 20 traverses the guide way 22.

In an exemplary embodiment of the invention, the distributing device 4 is rotatably arranged on the truck 20. The rotational axis of the distributing device 4 can here be invariable, meaning rigid, or variable. Therefore, the rotational axis can be pivoted in the latter case. The change in rotational axis can here be made manually or with an actuator activated by a controller.

The position of the guide way 22 relative to the tool mold and the area on which the material is instantaneously placed on the surface of the tool mold during the manufacturing process, along with the travel of the truck, make it possible to influence and establish the angle at which the material or material band is placed onto the tool mold, pivotable along a swiveling axis situated adjacent to the path of motion, preferably in the direction of the working surface. The application head can be moved along the path of motion in a defined working position, or if necessary be turned around the pivoting axis during a revolution along the path of motion, for example to generate a spiral coat.

It has proven to be especially advantageous for the path of motion to be configured as a circular, curved path, so that the section of the tool mold or component to be machined is situated in a central area, preferably a midpoint, of the path of motion.

In order to apply the composite at an angle of 0° relative to the longitudinal axis of the tool mold or the component, the bogie truck, for example, can move along the path of motion in an area of the working surface of the tool mold to be coated or the component, and the application head can pivot around the swiveling axis in a working position in which the composite has an angle of 0° in relation to the longitudinal axis of the tool mold or component.

In order to apply the composite at an angle ranging from more than 0° to about 90°, the application head can be pivoted around the swiveling axis into a working position in which the composite can be applied to the tool mold or component at an angle relative to the longitudinal axis of the latter of more than 0° to about 90°, preferably of ±45°, ±60° and/or 90°.

In tool molds or components that have a plurality of working surfaces, at least one application head can be provided for each working surface for the parallel application of at least one composite, in particular a composite band.

The process efficiency can be improved using application heads, with which several composite bands or strands can be simultaneously applied to the tool mold or component. The angles of the individual composite bands or strands can be set independently of each other, thereby preventing a spreading apart in the direction of the larger radius of curvature in the case of curved tool molds or components.

The width of the composite bands can vary when using application heads with several composite band, several application heads and/or carrier rings, so as to further improve process efficiency.

The guide way 22 can be designed as a closed path or an open path, or as a guide way segment. In particular, the guide way 22 can be designed as a circular path, as provided in the exemplary embodiment shown on FIG. 1. In order to support the guide way 22, the latter can be arranged on a carrier part 24 or be configured as a single piece with the latter. The carrier part can be sectionally annular or designed as a closed ring, and here be respectively circular as a whole. In general, the guide way is curved, with the formation of a variable or constant radius of curvature KR over the longitudinal extension of the latter. The guide way is here designed in such a way that the truck 20 can be moved on the interior side of the guide way. The guide way can also be curved.

It can here be provided that the radius of curvature of the curved path at least sectionally corresponds to the curvature of the tool mold or component. Tool molds or components having a curve progression with several radii of curvature can also be manufactured according to the invention.

During the implementation of the method or in one embodiment of the manufacturing device, the guide way 22 and/or the carrier part are preferably situated relative to the tool mold in such a way that the longitudinal extension of the guide way runs transverse to the longitudinal extension of an oblong tool mold, so that the guide way at least partially envelops or encompasses the tool mold 10 at a distance. The carrier part 24 can be supported by a framework 30. In addition, several carrier rings can be arranged one in back of the other along the longitudinal axis of the tool mold or component, wherein in particular varying angles of the composite bands or strands can be applied in an operation.

When configuring the guide way 22 as a closed circular path (FIG. 1), the tool mold 10 can be positioned relative to the carrier ring 24 in a static or controlled manner given a relative motion between the guide way and the tool mold or semi-finished product in such a way that the lateral surfaces 12, 16 of the tool mold or semi-finished product extend parallel to the vertical axis 26 of the carrier ring 24. In addition, the relative motion between the guide way and the tool mold or semi-finished product can be set mechanically or controlled in such a way that the area of the surface on which the material 6 is placed at a given point in time is arranged in the area of a midpoint M of the carrier ring 24, i.e., at a 10% deviation relative to the radius of curvature KR.

It can be provided according to the invention that the carrier ring has at least one rail for accommodating a roller set 32 of the bogie truck. The bogie truck 20 can here be powered by the rollers. Alternatively or additionally, the carrier ring can have at least one toothed segment, which can be engaged with at least one driving wheel of the bogie truck. For example, the driving wheel is designed as a toothed wheel that engages into a toothed rod of the carrier part. Other driving systems can also be used for moving the bogie truck along the path of motion. In the depiction on FIG. 1, the guide way has a rail (not shown) for accommodating a roller set 32 of the bogie truck 20, as well as a diagrammatically denoted toothed segment 34, which engages a driving wheel of the bogie truck 20 (not shown). The toothed segment 34 extends along the entire path of motion 22. For example, the driving wheel can be designed as a toothed wheel that engages into a toothed rod of the carrier ring 24. The roller set 32 has two roller pairs 36, 38 spaced apart from each other along the path of motion 22.

Given the ability of the distributing device 4 to rotate for setting the progression of the longitudinal direction of the placed material 6, the distributing device 4 is rotatable for placing the material 6 about a swiveling axis 40 which is inclined with regard to the path of motion 22 in the direction to the tool mold 10. The tool mold or component can here be arranged in such a way that the swiveling axis 40 in the exemplary embodiment of the device depicted runs at an angle of about 90° in relation to a tangent 42 applied to the radius of curvature R of the path of motion 22, and extends through the midpoint M of the circular path.

The manufacture of a fiber composite component can be optimized in this realization. Due to the bogie truck 20 that can move along the path of motion 22 enveloping the working surface 8, the pivoting distributing device 4 and the feed motion between the tool mold 10 and path of motion 22, the device 1 according to the invention is able to easily coat the curved tool mold 10 for manufacturing CFK fuselage frames from the standpoint of equipment. The composite band 6 can be applied onto the working surface 8 extensively, partially or based on other programmable patterns. The layer sequence and number of applied composite bands can be set based on the application. In particular, the composite band 6 can be applied at varying band angles relative to the longitudinal axis of the tool mold 10. In addition, any intermediate angles and angular progressions can be set. This will be explained in greater detail below on the basis of exemplary working positions A, B, and C of the distributing device 4.

As a result, the device according to the invention is able in particular to easily coat a curved tool mold or a curved component as well as other complex component geometries from the standpoint of equipment, wherein the term component in terms of the invention is also understood as part of a component or a semi-finished product. The flexible angular orientation and ability to locally incorporate reinforcing means reduces the weight of the components while maintaining a high level of strength. The layer sequence and number of applied layers varies depending on the application. The fiber progression can here be adjusted to the load path of the component, making it easy to manufacture light, high-strength structures. For example, the composite can be applied to the working surface at an angle of about 0°, ±45°, ±60° and/or 90° in relation to the longitudinal axis of the tool mold or longitudinal axis of the tool mold or the longitudinal axis of the component. Further, any intermediate angles and angular progressions can be set using the device according to the invention.

Figure 2:
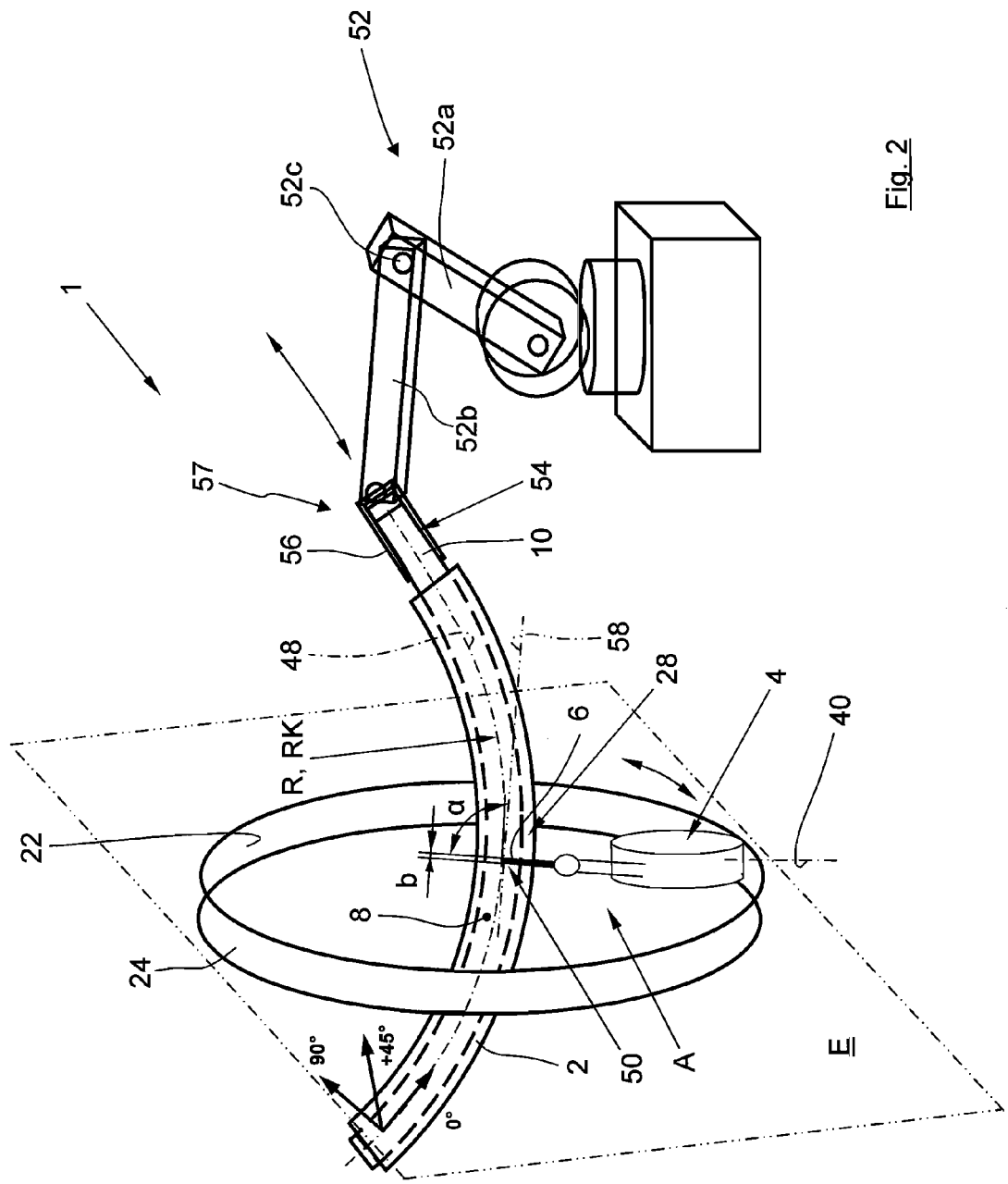
FIG. 2 is a spatial representation of the device from FIG. 1, in which a distributing device is located in a 90° working position.

As evident in particular from FIG. 2, which presents a spatial depiction of the device 1 from FIG. 1, the composite band 6 in the working position A of the distributing device 4 shown can be applied to the working surface 8 at a band angle $\alpha$ of 90° relative to the longitudinal axis 48. To this end, the distributing device 4 is pivoted around the swiveling axis 40 into the working position A, in which the composite band 6 is applied to the tool mold 10 or already applied band material at the desired band angle $\alpha$ of 90° in relation to the longitudinal axis 48. One end segment 50 of the composite band 6 is placed on the working surface 8 of the tool mold 10, and traversed along the path of motion 22 by 360° to the working surface 8 spaced apart from the distributing device 4 by means of the bogie truck 20 not shown on FIG. 2 (see FIG. 1), so that the composite band 6 is wound onto the tool mold 10. The band 6 is then separated, and the tool mold 10 is traversed relative to the path of motion 22 corresponding to the measure of a band width b. This sequence is repeated until the desired area of the tool mold 10 is provided with a defined laminated structure. The composite band 6 can be applied at other band angles after, in between or before this process. To achieve a more efficient coating, the 90° band angle is reduced by an angular deviation that depends on the circumference of the tool mold 10 and band width b. This enables a continuous, spiral coating of the tool mold in a single operation. The band angle $\alpha$ can be set to different values as a function of the rotational speed of the bogie truck 20 (see FIG. 1) along the path of motion 22 and the feeding speed of the tool mold 10.

The movement of the tool mold or mold or generally the tool 10 relative to the carrier ring 24 takes place by means of a feeder Z, which can be actuated manually or via a controller. The feeder is provided for executing a feeding motion of the tool mold 10 or semi-finished product 2 relative to the guide path 22, and has a coupling device for holding or securing a section or end section 54 of the tool mold 10 or the semi-finished product 2. The feeder can have an actuating arm or robot arm 52 with the coupling device or a truck 60 with the coupling device that can traverse a feed path 62. The actuating arm or robot arm 52 or the truck 62 is moved by a mechanical actuator or guide, which constitutes part of the feeder or is allocated to the feeder and functionally connected thereto. In particular, the mechanical actuator can have the driving device for actuating the feeder. The guide can encompass the functions for the control, regulation of the feeder or mechanical actuator. In particular, the mechanical actuator or guide can be part of a motion controller. The motion controller can exhibit control functions for three-dimensionally moving the actuating arm or robot arm 52 or for moving the bogie truck 20 along the path of motion 22 and/or the distributing device 4 along the pivoting axis 40 and/or the respective tool mold 10 or the semi-finished product 2 and/or the path of motion 22 relative to each other. To this end, the motion controller can have the mechanical actuator or guide for three-dimensionally moving the actuating arm or robot arm 52 or for moving the bogie truck 20 along the path of motion 22 and/or the distributing device 4 along the pivoting axis 40 and/or the respective tool mold 10 or the semi-finished product 2 and/or the path of motion 22 relative to each other.

In the exemplary embodiment of the coupling device of the feeder with a combination of a feed path 62 with a truck 60 that can move thereupon or an actuating arm or robot arm 52, the latter have a coupling device with which an end section 54 of the tool mold 10 or the semi-finished product 2 can be secured to the truck 60 or the actuating arm or robot arm 52, and in particular to an end section of the truck 60 or arm 52. As a result, the tool mold 10 or semi-finished product 2 can be moved relative to the path of motion 22 and/or the distributing device 4 as the truck 60 or actuating arm or robot arm 52 moves. The coupling device of the truck 60 or the actuating arm or robot arm 52 can be designed for securing the tool mold 10 or semi-finished product 2 in such a way that it can at least sectionally envelop the tool mold 10 or semi-finished product and in particular an end section of the latter. Other attachment means can also be provided. For example, the coupling device can be designed in such a way as to positively accommodate in particular an end section of the tool mold 10 or semi-finished product 2.

In this case, the feeder can in particular have an actuating arm or robot arm 52 (FIGS. 2 and 3), which is arranged outside the path of motion 22 or the carrier ring 24, and which is connected with the tool mold in such a way, for example, as to sectionally envelop an end section 54 of the tool mold 10 with a gripper 56. In particular, the actuating arm 52 can consist of a first arm 52a and a second arm 52b that is coupled to the first arm 52a by means of a hinge 52c, and accommodates the coupling device 57. For example, the tool mold or semi-finished product 10 is curved in the area of the frame in accordance with the cross section of the airplane fuselage, thereby giving it an arc-shaped longitudinal axis 48. When using a semi-finished product without a tool mold, or securing the semi-finished product to the coupling device, the semi-finished product has been given a dimensionally stable state, for example by sewing or pre-hardening. In order to coat the tool mold to generate a semi-finished product or a perform for manufacturing the component to be fabricated or the semi-finished product, the latter can be moved relative to the path of motion 22 along a curved path (feed path) by means of the arm 52 or truck 60. This curved path can be provided in such a way as to be described as three dimensional. In particular, it can lie in a plane. Especially if the central line of the semi-finished product or tool mold lies in a plane, it can be provided that the curved path also lie in a plane. In particular, the connecting line of the centroids of the respectively smallest cross sections along the longitudinal direction of the semi-finished product or tool mold can be used as the central line.

It can here be provided that the curvature with the generally locationally dependent radius of curvature RK, which has the curved path implemented by the arm 52 or its end section or the truck 60 via the motion controller or motion mechanics, reflect or reproduce the curvature or radius of curvature R of the tool mold 10 in relation to its longitudinal axis 48 or central line. A deviation of 10% relative to the length of the semi-finished product or tool mold can here be permitted. The tool mold 10 can further be positioned relative to the carrier ring 24 in such a way that a tangent 58 applied to the curved arc of the tool mold 10 in the area of its section 28 to be machined run at an angle of 90 degrees ±15 degrees, and in particular ±5 degrees in relation to a plane E clamped by a relevant segment of the guide path 22. The device 1 has allocated to it a controller (not shown), in particular with a CNC control unit, for controlling the motion of the bogie truck 20 along the path of motion 22 and/or distributing the material from the distributing device 4 and/or rotating the distributing device 4 and/or possibly changing the pivoting axis and/or the feeding motion of the tool mold 10 or semi-finished product 2 relative to the path of motion 22. It is especially advantageous for the movement of the bogie truck 20 along the path of motion 22 and feeding motion of the tool mold 10 or semi-finished product 2 be interdependent. For example, the feeding motion of the tool mold 10 or semi-finished product 2 can take place synchronously to the movement of the bogie truck 20 and/or with a defined transmission or reduction ratio, so as to set the band angle α (the angle between the longitudinal direction of the material when placing the latter onto the surface 8 and the tangent on the central longitudinal axis of the tool mold 10 or semi-finished product at the location where the material is instantaneously placed upon the surface 8, and viewed in the tangential plane of the surface 8). In an alternative variant for manufacturing a laminate structure with a band angle α of 90°±5 degrees, the carrier ring 24 is traversed relative to the tool mold 10.

Figure 3:
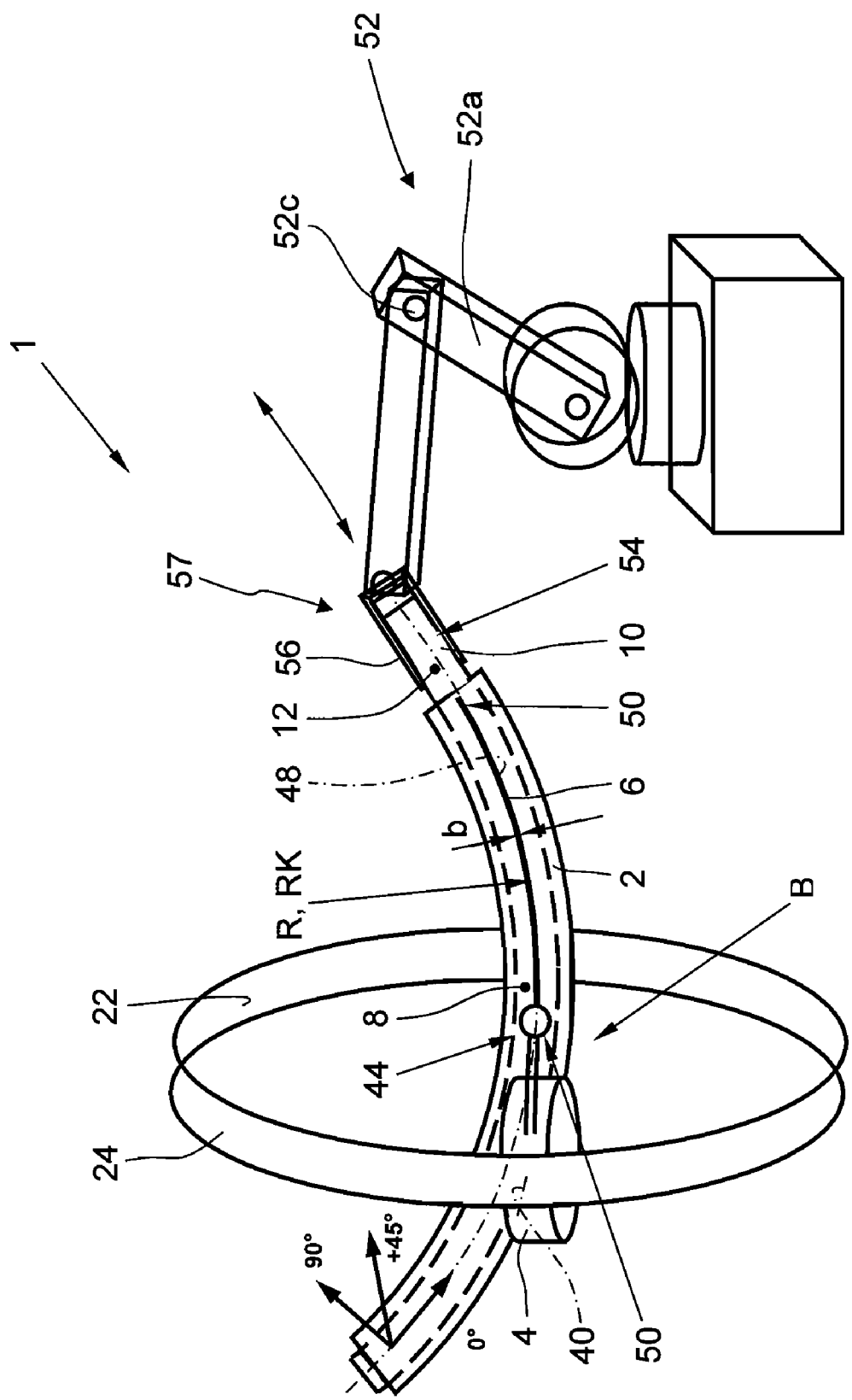
FIG. 3 is a spatial representation of the device from FIG. 1, wherein the distributing device is located in a 0° working position.

FIG. 3 presents a spatial representation of the device 1 from FIG. 1, in which the distributing device 4 is in a working position B in which the composite band 6 is applied to the working surface 8 at a band angle α of 0° in relation to the longitudinal axis 48 of the tool mold 10. In order to fabricate a laminate structure with a band angle α of 0° in relation to the longitudinal axis 48 of the tool mold 10, the distributing device 4 is moved along the path of motion 22 formed on the carrier ring 24 in an area of the working surface 8 of the tool mold 10 to be coated, and pivoted around the swiveling axis 40 into the 0° working position B, in which the composite band 6 can be applied to the tool mold 10 at a band angle α of 0° in relation to the longitudinal axis 48 of the tool mold. The end section 50 of the composite band 6 is placed on the working surface 8 via the application device 44. The robot arm 52 then moves the tool mold 10 along the curved path corresponding to the radius of curvature R of the tool mold 10 relative to the path of motion 22, wherein the composite band 6 is placed on the working surface 8 via the distributing device 4 (fiber placement). The distributing device 4 maintains its position on the carrier ring 24, while the tool mold 10 is moved relative to the carrier ring 24.

In the depicted tool mold 10 with an essentially rectangular cross section, the four lateral surfaces 12, 14, 16, 18 (see FIG. 1) of the tool mold 10 can be coated, for example, by traversing the distributing device 4 by a respective 90° along the path of motion 22. The distributing device 4 is here moved from the depicted 9 o'clock position along the path of motion 22 into a 6 or 12 o'clock position, and subsequently into a 3 o-clock position. Further, at least one distributing device 4 can be provided for such tool molds 10 or other components that have a plurality of lateral surfaces 12, 14, 16, 18, wherein the lateral surfaces can be coated simultaneously. The band width b of at least one distributing device 4 can further be selected in such a way that the lateral surfaces 12, 14, 16, 18 are each completely coated with the composite band 6 in one operation.

In a variant of the device that is not depicted, the carrier ring 24 traverses relative to the tool mold 10.

According to the solution proposed by the invention, a composite in the form of a composite band can be applied with varying band angles in relation to a longitudinal axis of the tool mold or component. At a band angle in a range of about 45° in relation to the longitudinal axis of the tool mold or component, it has been proven advantageous for the width b of the composite band to be a function of the circumference C of the tool mold or component in accordance with the formula $$b = \frac{C}{\sqrt{2}}.$$

At such a width b of the composite band, the tool mold or component can be completely covered in a single operation.

Figure 4:
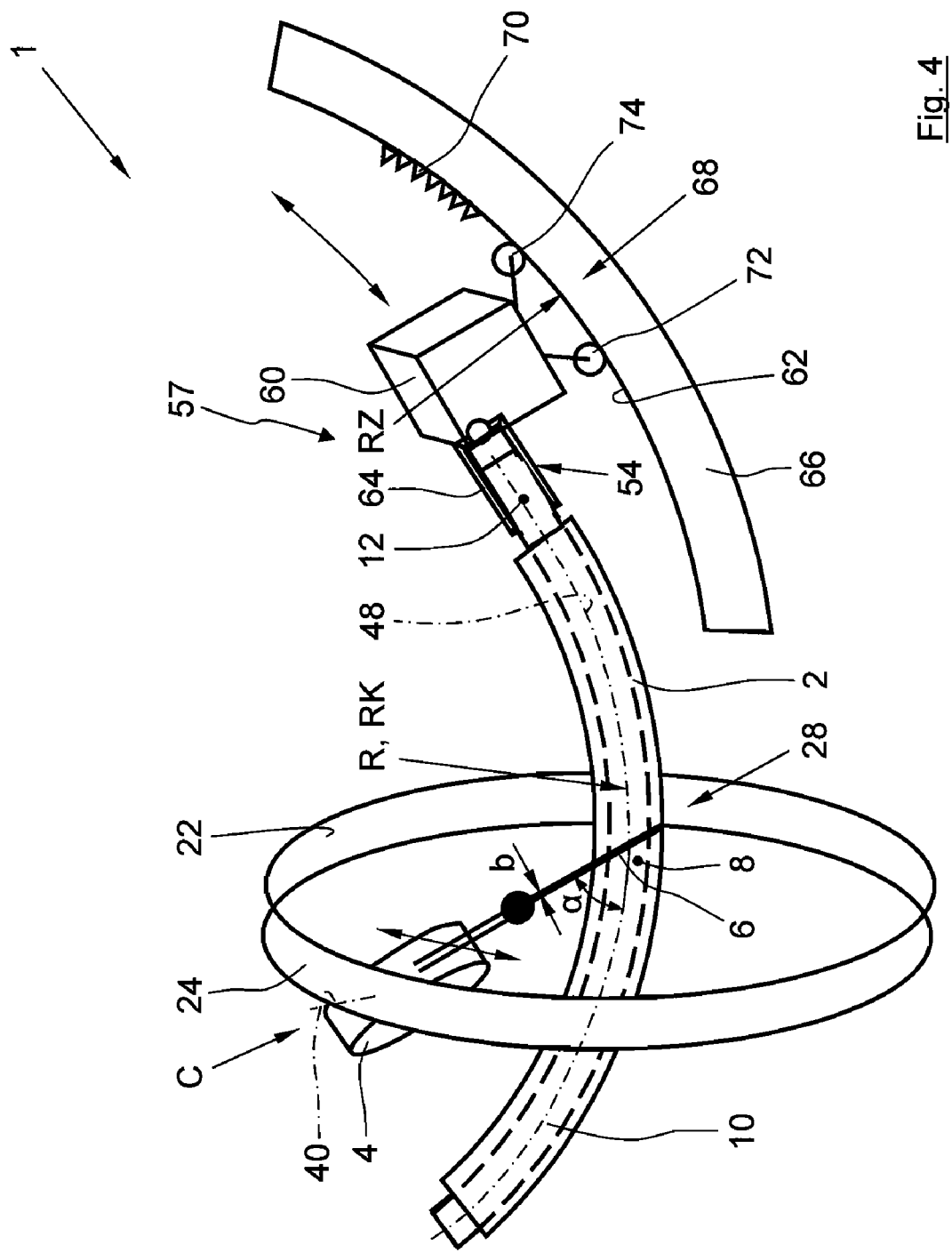
FIG. 4 is a spatial representation of a device according to a second exemplary embodiment of the invention, wherein the distributing device is located in a 45° working position.

FIG. 4 presents a spatial representation of a device 1 with a working position C of the distributing device 4, in which the composite band 6 is applied to the working surface 8 at a band angle α of 45° in relation to the longitudinal axis 48 of the tool mold. In order to fabricate a laminate structure with a band angle α of 45°, the distributing device 4 is turned around the swiveling axis 40 into a 45° position. The tool mold 10 is then moved along the path of motion 22 according to the radius of curvature R of the tool mold 10 relative to the path of motion 22 and the distributing device 4, wherein the composite band 6 is wound around the tool mold 10 via the distributing device 4. At the depicted band angle α of about 45° in relation to the longitudinal axis 48 of the tool mold 10, it has been proven advantageous for the width b of the composite band 6 to be a function of the circumference C of the tool mold 10 in accordance with the formula $$b = \frac{C}{\sqrt{2}}.$$

At this or a greater width b of the composite band 6, the tool mold 10 is completely covered in a single operation. According to the exemplary embodiment of the invention depicted on FIG. 4 and especially suited for a tool mold 10 with a constant radius of curvature R, the tool mold 10 is guided by a feeder truck 60 that can move a feed path 62, wherein the tool mold or semi-finished product or an end section of the latter can be secured to the feeder truck 60 via the coupling device. In particular, the coupling device can have a gripper 64, with which a section or end section 54 of the tool mold 10 can be at least sectionally enveloped. In this variant, the feed path 62 is designed as a curved path on a carrier part 66. In particular, the radius of curvature RZ of the feed path 62 can correspond to the radius of curvature R of the tool mold 10. The tool mold 10 is positioned in such a way that the section 28 of the tool mold 10 to be machined is located in the area of the center of the carrier ring 24. The carrier part 66 has a rail (not shown) for accommodating a roller set 68 of the bogie truck 60, and a diagrammatically denoted toothed section 70, which engages a driving wheel of the feed truck 60 (not shown). The toothed section 70 preferably extends along the entire feed path 62. The roller set 68 has two roller pairs 72, 74 spaced apart from each other along the feed path 62. For example, the driving wheel can be designed as a toothed wheel that engages a toothed rod of the carrier section 66.

According to the invention, it is possible to arrange more than one application head along the path of motion of the carrier ring. For example, at least one pair of application heads can be provided that are offset relative to each other by an angle of about 180° and can traverse the path of motion. In an arrangement of application heads offset relative to each other by 180°, it is advantageous to compensate for the pressures placed on the tool mold or component. In this variant, the tool mold or component can be completely covered in one operation at a reduced weight of the device. Further, the application heads can be moved independently of each other, wherein it is advantageous that the application heads be controlled based on a shared time basis. The device has also proven especially advantageous for manufacturing frames, n particular CFK fuselage frames, or fuselage segments of an airplane. The web and flange height along with the thickness of the laminate structure can be variable or constant along the longitudinal extension of the component.

Figure 5:
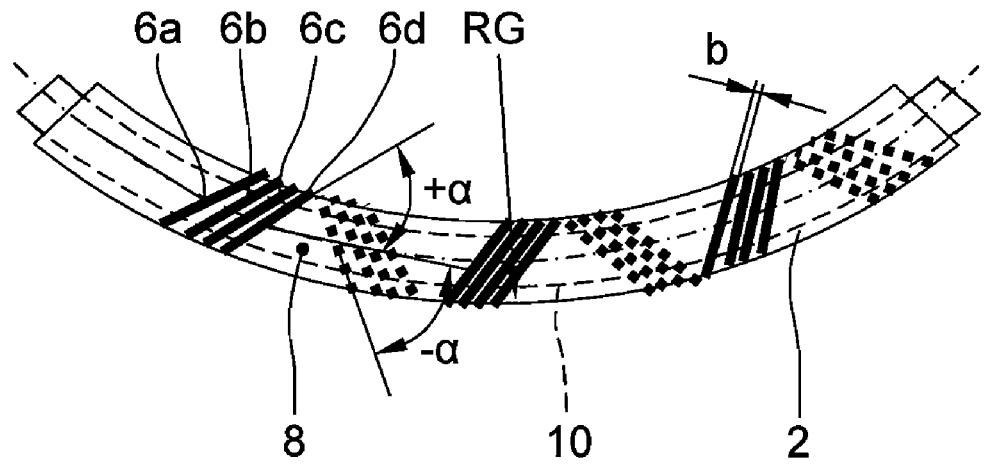
FIG. 5 is a side view of the partially coated tool mold from FIG. 4 with about ±45° fiber orientations.
Figure 6:
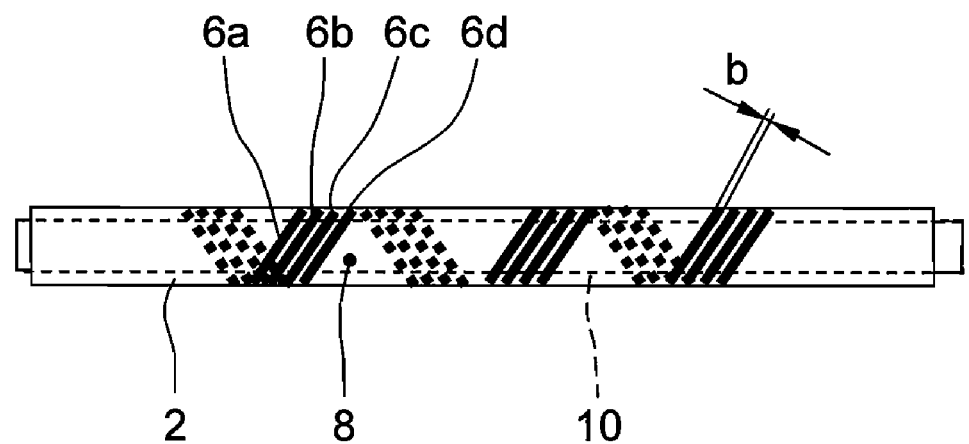
FIG. 6 is a top view of the partially coated tool mold from FIG. 4.

According to FIGS. 5 and 6, which present a component drawing providing a side view and top view of the partially coated tool mold 10 from FIG. 4, the process efficiency can be improved using several application heads 4, with which several composite bands 6 can be applied to the working surface 8 at the same time. In the exemplary embodiment shown, four composite bands 6a, 6b, 6c, and 6d were applied at the same time. The band angles of the individual composite bands 6a, 6b, 6c, and 6d can here be set independently of each other, thereby preventing the band from spreading in the direction of the larger radius of curvature RG of the tool mold as depicted on FIG. 5, which occurs with curved tool molds 10. The widths b of the composite bands 6a, 6b, 6c, and 6d can vary when using application heads 4 with several composite bands, so as to further improve the process efficiency. In particular, the material can be placed on the tool mold or semi-finished product as the latter are correspondingly advanced at a constant rotational setting of the distributing device, as shown for a rotational setting of α=45° on FIGS. 5 and 6.

The frame can have a C-shaped cross section and be designed as a single piece. In addition, the frame can have several partial profiles, for example an L and a C-profile. Further, a frame with an E-shaped cross section can be fabricated. To this end, use is preferably made of two cores, which are separately coated in a first operation, and subsequently coated together.

In order to manufacture a so-called LCF cross section, use is preferably made of two cores, which are also separately coated in a first operation, and then subsequently coated together. A leg of the profile is then bent outward in a thermoforming process at an angle of 90° in relation to the profile web, for example. The angle between the web and flange can be greater or less than 90° in all cross sectional variants, so as to ensure that the flange adjoins flush to a curved surface of the airplane fuselage. Stepped recesses in the flange for the attachment legs of the longitudinal airplane reinforcements (stringers) can already be provided while manufacturing the frames, or, for example after incorporating the through holes for the longitudinal airplane reinforcements, be fabricated in a thermoforming process.

In one embodiment, the tool mold has at least one pair of grooved recesses arranged diametrically opposed to each other, which each extend parallel to a longitudinal axis of the tool mold. The grooved recesses serve as an outlet for the separating sheet of a separating device used to divide the fiber composite structure into two or four profiles. For example, given a tool mold with a roughly rectangular cross section, the generated fiber composite structure can be divided into two roughly C-shaped or four L-shaped profiles, which can be used as frames or parts of a frame. The composite structure can be separated before or after the curing process. If separation takes place before curing, the component is preferably placed in a negative mold after the separation process, optionally along with a core, for example a part of then multi-part tool mold, and cured. If separation takes place after curing, the unseparated component, if necessary placed in a negative mold, is evacuated together with the tool mold and cured in an autoclave. The cured component is then separated and demolded.

In a method according to the invention for manufacturing a fiber composite component, for example a CFK frame or a fuselage segment for an airplane, a composite is applied at a defined angle to at least one working surface of a tool mold or component by means of at least one application head, wherein the application head is moved relative to the working surface by at least one bogie truck along a path of motion that at least sectionally envelops the working surface.

In an especially preferred exemplary embodiment of the invention, the application head is pivoted, in particular turned, along a swiveling axis placed adjacent to the path of motion to set the composite angle on the working surface.

The tool mold or component and the path of motion are preferably moved relative to each other to apply the composite onto the working surface.

The composite band is preferably applied to the working surface in accordance with the component contour to be fabricated.

In order to manufacture a laminate structure with an angle of 0° in relation to the longitudinal axis of the tool mold or component, the bogie truck is preferably moved along the path of motion in an area of the working surface of the tool mold or component to be coated, and pivoted around the swiveling axis into a working position in which the composite can be applied to the tool mold or component at an angle of 0° in relation to the longitudinal axis of the latter, wherein the tool mold or component is moved relative to the path of motion (fiber placement). This means that the bogie truck stands motionless while the tool mold or component is moved relative to the path of motion.

Figure 7:
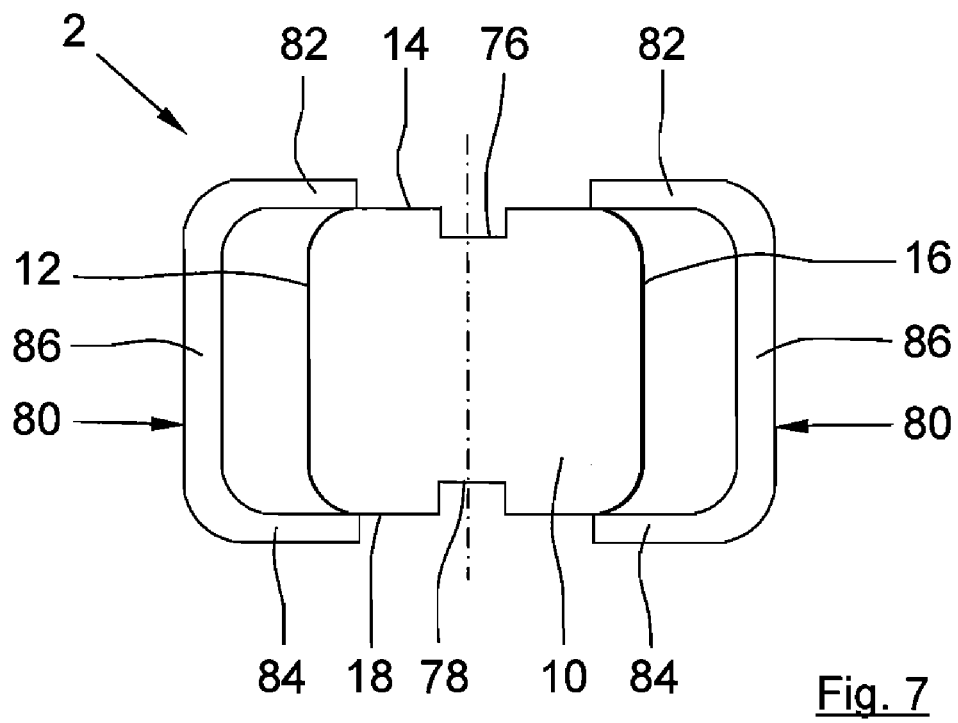
FIG. 7 is an already partially demolded fiber composite component and the tool mold used in its manufacture.

As evident from FIG. 7, which depicts an already partially demolded fiber composite component 2 and a tool mold 10 used in its manufacture, the tool mold 10 has two diametrically opposed, roughly U-shaped recesses 76, 78, which are incorporated into the lateral surfaces 14, 18 of the tool mold 10, and each extend parallel to the longitudinal axis 48 (see FIG. 2) of the tool mold 10. The grooved recesses 76, 78 serve as an outlet for the separating sheet of a separating device (not shown) used for separating the fiber composite structure 2. For example, in a tool mold 10 with a roughly rectangular cross section, the generated fiber composite structure 2 can be divided into two C-shaped profiles 80, which can be used for CFK frames of an airplane. The C-frames 80 each have two flanges 82, 84 connected by a web 86, wherein the respective angle between the upper and lower flange and the web measures about 90°. The web and flange height as well as the thickness of the laminate structure can be variable or constant along the longitudinal extension of the frames 80. The composite component 2 can be separated before or after curing. If separation takes place before curing, the unseparated component 2 is preferably placed in a negative mold after the separation process, optionally along with a core, and cured. If separation takes place after curing, the unseparated component, if necessary placed in an additional negative mold, is evacuated together with the tool mold and curved in an autoclave. The cured component is then separated and demolded.

Figure 8:
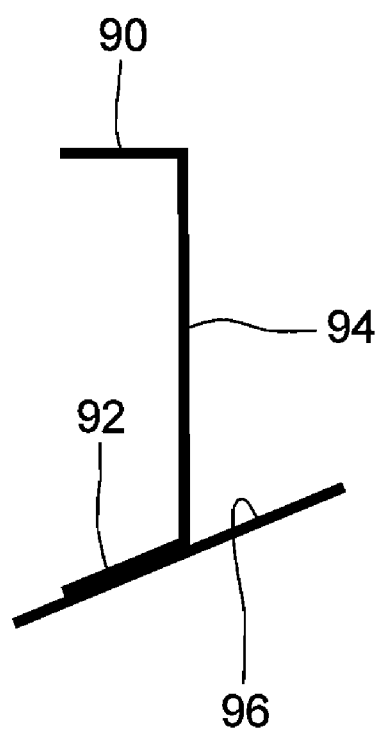
FIG. 8 is an individual depiction of a CFK fuselage frame (including fuselage skin segment) with a roughly C-shaped cross section.

FIG. 8 depicts an individual representation of a CFK fuselage frame 88 with a roughly C-shaped cross section according to another exemplary embodiment. The frame 88 has two flanges 90, 92, which are connected by means of a web 94, wherein the angle between the upper flange 90 and the web 94 measures about 90°, and the angle between the lower flange 92 and the web 94 measures about 110°, in order to ensure a flush connection of the flange 92, for example with the curved surface 96 of an airplane fuselage.

Figure 9:
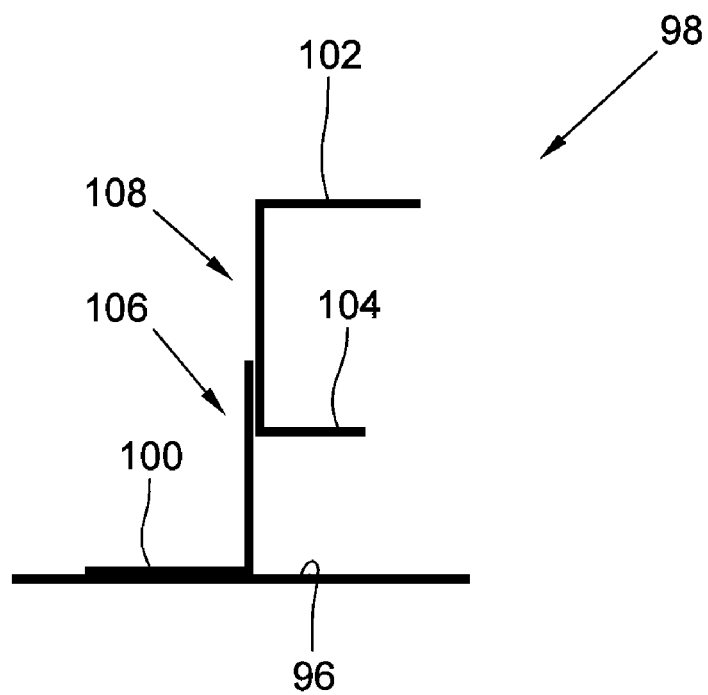
FIG. 9 is an individual depiction of a CKF fuselage frame having several partial profiles.
Figure 10:
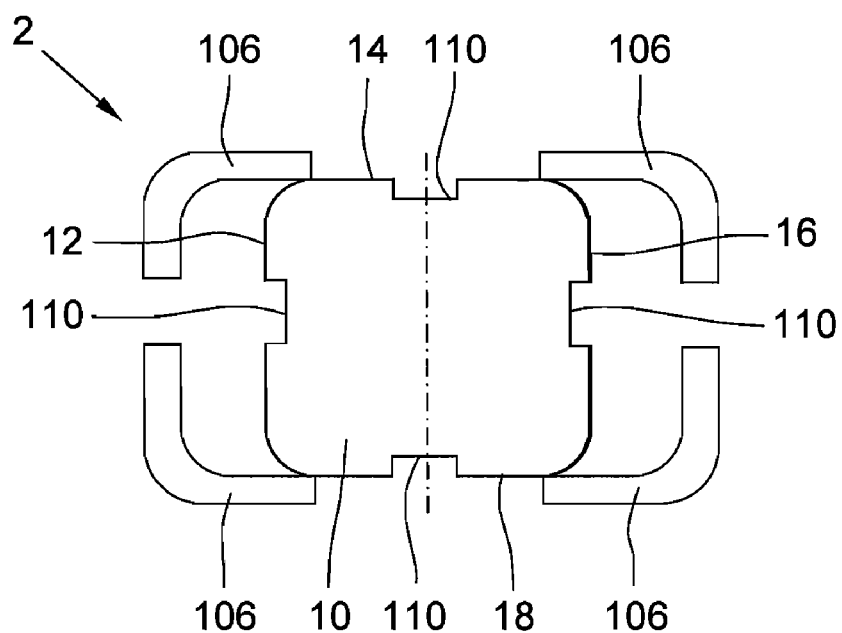
FIG. 10 is a tool mold for manufacturing L-shaped profiles.

According to FIG. 9, which shows an exemplary embodiment of a frame 98 with a so-called LCF cross section in which an attachment flange 100 is arranged on a side lying opposite a flange 102 and a reinforcing rib 104, the frame 98 can have several partial profiles, for example an L and a C-profile 106, 108. For example, the C-profiles 106 can be manufactured as described on FIG. 7. FIG. 10 will be used below to describe a preferred tool mold for manufacturing the L-shaped profiles 108 below.

The tool mold 10 according to FIG. 10 has two pairs of diametrically opposed, roughly U-shaped recesses 110, which extend parallel to the longitudinal axis 48 (see FIG. 2) of the tool mold 10 in the area of the lateral surfaces 12, 14, 16, and 18. As already explained, the grooved recesses serve as an outlet for the separating sheet of a separating device (not shown) used to divide the fiber composite component 2. After the component 2 has been separated, the four curved L-profiles 106 can be removed from the tool mold 10.

Figure 11:
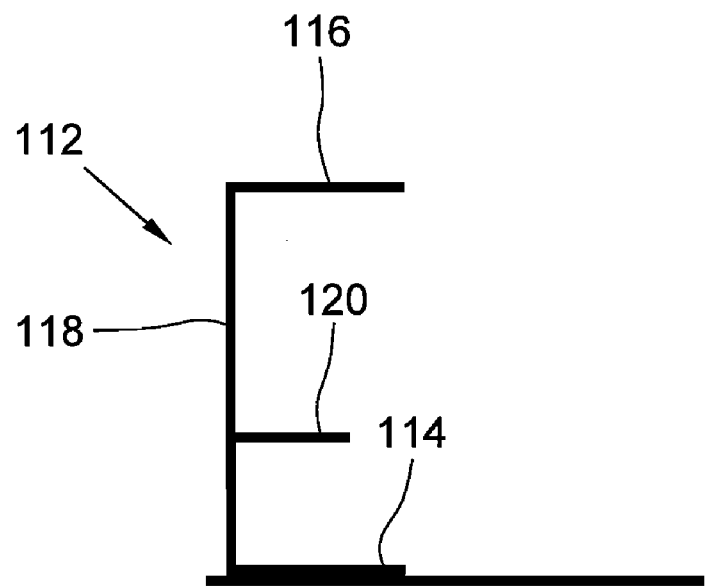
FIG. 11 is an exemplary embodiment of a CFK fuselage frame with a roughly E-shaped cross section.

FIG. 11 depicts an exemplary embodiment of a CFK fuselage frame 112 with a roughly E-shaped cross section. The one-piece frame 112 has two flanges 114, 116, which are connected by means of a web 118, wherein a reinforcing rib 120 is arranged between the flanges 114, 116. The reinforcing rib 120 extends parallel to the flanges 114, 116, wherein the angle between the lower and upper flange 114, 116 and the web 118 as well as the angle between the reinforcing rib 120 and the web measures about 90° in the exemplary embodiment shown.

Figure 12:
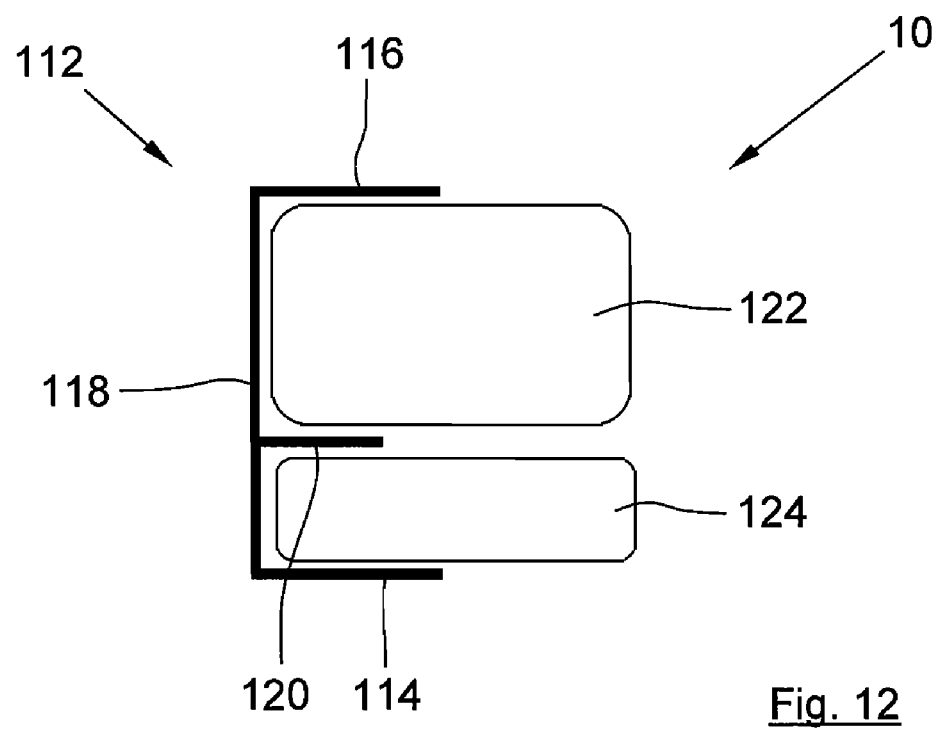
FIG. 12 is the CFK fuselage frame from FIG. 11 with tool mold.

According to FIG. 12, which shows the CFK fuselage frame 112 from FIG. 11 with tool mold, wherein only one component half is depicted, it is manufactured using two cores 122, 124 that are each individually coated in a first operation and then coated together. In the exemplary embodiment of the invention depicted, the upper core 122 has an enlarged cross sectional surface relative to the lower core 124, so that the distance between the flange 116 and the reinforcing rib 120 is enlarged in relation to the distance of the flange 114 to the reinforcing rib 120.

Figure 13:
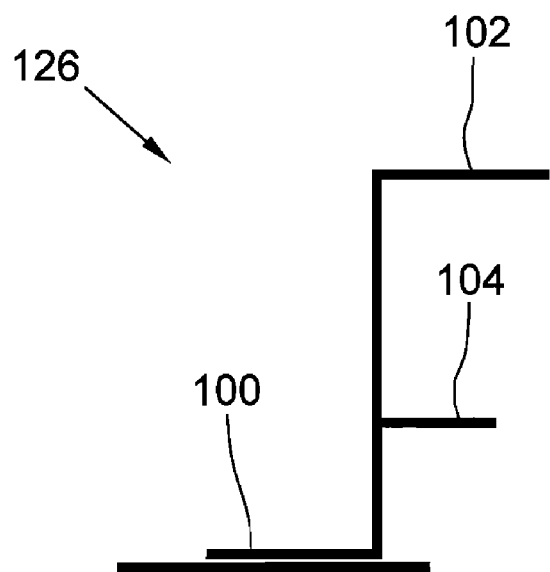
FIG. 13 is a one-piece CFK fuselage frame with LCF cross section.
Figure 14:
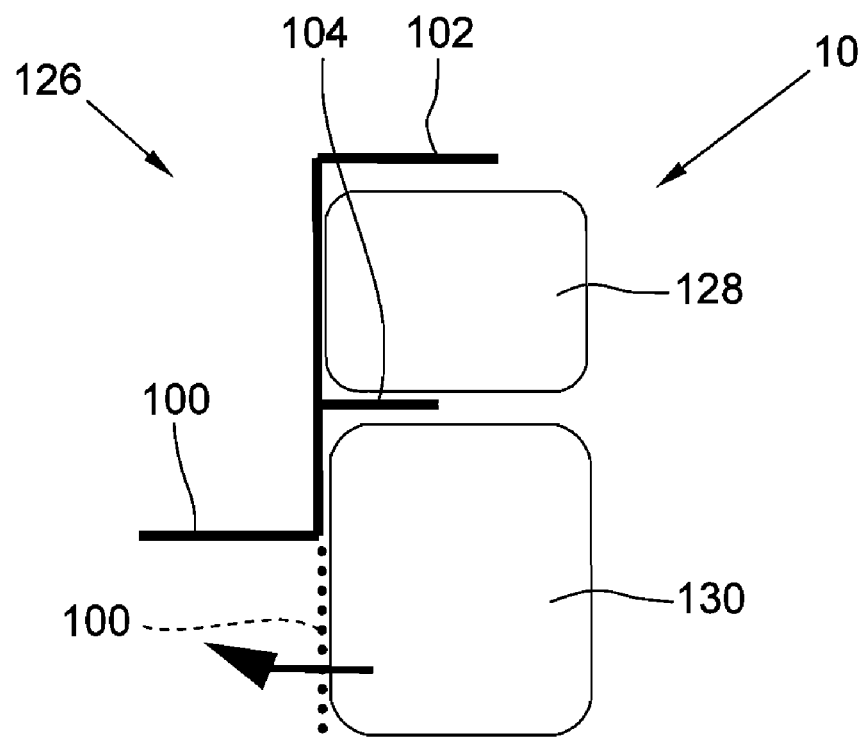
FIG. 14 is the CFK fuselage frame from FIG. 13 with tool mold.

In order to fabricate a one-piece frame 126 with LCF cross section of the kind depicted on FIG. 13, two cores 128, 130 coated separately in a first operation and then jointly are also used in accordance with FIG. 14, which presents the CFK fuselage frame 126 with tool mold 10, wherein only a single component half is shown. After the component halves have been separated, the leg section 100 of the profile 126 is curved outward, for example at an angle of 90° relative to the flange 100, in a thermoforming process, as denoted by an arrow.

Stepped recesses (not shown) of the flanges 92, 100, and 114 for attachment legs of longitudinal airplane reinforcements, so-called stringers, can already be provided while manufacturing the frames 80, 88, 98, 112, and 126, or, for example after incorporating the through holes (not shown) for the stringers, be fabricated in a thermoforming process.

The device according to the invention is not limited to the described embodiment with only one distributing device 4, wherein a plurality of application heads 4 can instead be arranged so as to traverse the path of motion 22 of the carrier ring, in order to further optimize the process rate. The application heads 4 can move independently from each other, wherein it is advantageous that they be controlled based on a shared time basis. For example, two application heads 4 are provided that can traverse the path of motion 22 offset relative to each other by an angle of about 180°. In the case of application heads 4 offset by 180° relative to each other, it is advantageous to compensate for the pressures exerted on the tool mold 10 or component 2. In addition, the invention is not limited to the depicted configuration with only one carrier ring 24, wherein several carrier rings 24 can be arranged serially one in back of the other, in which case it can be provided that in particular composite bands 6 can be applied at varying band angles in one operation. Further, the invention is not limited to curved tool molds 10 or components 2.

In a tool mold with an essentially rectangular cross section, all four lateral surfaces of the tool mold are preferably coated, wherein the respective application head is moved by 90° along the path of motion. The application head is preferably pivoted along the path of motion in a 3, 6, 9 and 12 o'clock position. Further, these tool molds or components, which have a plurality of working surfaces, can be provided with at least one application head for each working surface, wherein the lateral surfaces are coated at the same time.

For a laminate structure with an angle of more than 0° to about 90°, preferably of ±45°, ±60° and/or 90° in relation to the longitudinal axis of the tool mold or component, the application head is pivoted around the swiveling axis into a working position in which the composite is applied to the working surface at the desired angle, wherein the tool mold or component is moved relative to the path of motion and the bogie truck along the path of motion (fiber winding). Various angles can be set by adjusting the rotational speed of the bogie truck along the path of motion and the feeding speed of the feed truck. For example, the application head is turned into a 90° setting for a 90° band progression of a composite band, an end section of the composite band is pressed onto the working surface, and the application head is moved along the path of motion at 360° by the bogie truck, wherein a composite strip is applied to the tool mold. The band is then separated, and the tool mold or component is traversed along the feed path by the measure of one band width. To make coating more efficient, the 90° angle is decreased or increased by an increment that depends on the circumference of the tool mold or component and the band width. The angle and ensuing location of the composite material can be increased or decreased by a deviation, thereby balancing out the material properties. This enables a continuous, spiral coating of the tool mold or component.

In an alternative variant for fabricating a laminate structure, a carrier ring having the path of motion is moved relative to the tool mold or component.

REFERENCE LIST

| | |
|---|---|
| 1 | Device |
| 2 | Fiber composite component |
| 4 | Distributing device |
| 6 | Composite band |
| 8 | Working surface |
| 10 | Tool mold |
| 12 | Lateral surface |
| 14 | Lateral surface |
| 16 | Lateral surface |
| 18 | Lateral surface |
| 20 | Bogie truck |
| 22 | Path of motion |
| 24 | Carrier ring |
| 26 | Vertical axis |
| 28 | Section |
| 30 | Framework |
| 32 | Roller set |
| 34 | Toothed section |
| 36 | Roller pair |
| 38 | Roller pair |
| 40 | Swiveling axis |
| 42 | Tangent |
| 44 | Application device |
| 46 | Housing |
| 48 | Longitudinal axis |
| 50 | End section |
| 52 | Robot arm |
| 54 | End section |
| 55a | First arm |
| 55b | Second arm |
| 55c | Hinge |
| 56 | Gripper |
| 57 | Coupling device |
| 58 | Tangent |
| 60 | Feed truck |
| 62 | Feed path |
| 64 | Gripper |
| 66 | Carrier section |
| 68 | Roller set |
| 70 | Toothed section |
| 72 | Roller pair |
| 74 | Roller pair |
| 76 | Recess |
| 78 | Recess |
| 80 | C-profile |
| 82 | Flange |
| 84 | Flange |
| 86 | Web |
| 88 | CFK fuselage frame |
| 90 | Flange |
| 92 | Flange |
| 94 | Web |
| 96 | Surface |
| 98 | Frame |
| 100 | Flange |
| 102 | Flange |
| 104 | Reinforcing rib |
| 106 | L-profile |
| 108 | C-profile |
| 110 | Recess |
| 112 | Frame |
| 114 | Flange |
| 116 | Flange |
| 118 | Web |
| 120 | Reinforcing rib |
| 122 | Core |
| 124 | Core |
| 126 | Frame |
| 128 | Core |
| 130 | Core |
| 132 | Leg section |

The invention claimed is:

1. A method for manufacturing an FC component with at least one distributing device for placing band-shaped material onto a surface of a tool mold or semi-finished product for manufacturing the FC component, the method comprising:
arranging the distributing device on a bogie truck such that the distributing device traverses along a guide way that runs around the surface at least partially in its circumferential direction, wherein the distributing device is rotatably articulated on the bogie truck and comprises a receiving roller for receiving and dispensing band prepreg material such that the band prepreg material is placed on the surface, holding an end section of the tool mold or semi-finished product by means of a coupling device in order to execute a feed motion of the tool mold or semi-finished product relative to the guide way.

2. A device for manufacturing a FC component with at least one distributing device for placing material onto a surface of a tool mold or semi-finished product to manufacture the FC component, wherein the device comprises:

a circumferentially extending guide way, a feeder for moving the tool mold or semi-finished product relative to the guide way, a bogie truck with a distributing device respectively comprising a roller set, the bogie truck being supported by the guide way and being movable along the guide way, wherein the distributing device is rotatably articulated on the bogie truck and comprises a receiving roller for receiving and dispensing band prepreg material, and the feeder has a coupling device for holding an end section of the tool mold or semi-finished product in order to execute a feed motion of the tool mold or semi-finished product relative to the guide way.

3. The device of claim 2, wherein the device is realized such that the bogie truck is movable relative to the surface and die tool mold or the semi-finished product is movable relative to the bogie truck.

4. The device of claim 2, wherein the feeder has a robot arm with the coupling device.

5. The device of claim 4, wherein the robot arm is arranged outside the bogie truck, and at least sectionally envelops an end section of the tool mold or semi-finished product.

6. The device of claim 2, wherein the device has a feed path and a feed truck traversable thereupon, which can hold the tool mold or semi-finished product.

7. The device of claim 6, wherein the feed path has at least one rail for accommodating a roller set of the feed truck.

8. The device of claim 6, wherein the feed path has at least one toothed section, which can be engaged with at least one driving wheel of the feed truck.

9. The device of claim 2, wherein the device has a motion controller for at least one of: (i) the bogie truck along a path of motion, (ii) the distributing device along a swiveling axis, (iii) the tool mold or semi-finished product, and (iv) the feed motion relative to the guide way.

10. The device of claim 2, wherein the movement of the bogie truck along the guide way as well as the feed motion of the tool mold or semi-finished product and the guide way can be coupled with each other by means of a coupling device.

11. The device of claim 2, further comprising a motion controller designed in such a way that, given a predetermined curvature of the tool mold or semi-finished product in a longitudinal direction with a radius of curvature (RK) that is variable or non-variable along the longitudinal direction, the direction of the radius of curvature (RK) toward a midpoint of a region on which the band material is being placed by the distributing device onto the surface of the tool mold or semi-finished product deviates by at most 30 degrees from a radial plane (E) that is mounted by the guide way, or by a tangential plane at the instantaneous location of the truck.

12. The device of claim 3, wherein the coupling device has a gripper designed in such a way that it can envelop the tool mold or semi-finished product at least sectionally at one end.

13. The device of claim 2, wherein the distributing device can be pivoted around a swiveling axis that runs transversely to the guide way.

14. The device of claim 2, wherein the guide way is designed on an annular carrier part that circles the tool mold or semi-finished product.

15. The device of claim 2, wherein the guide way has at least one rail for accommodating a roller set of the bogie truck.

* * * * *